United States Patent
Dockser et al.

(10) Patent No.: US 9,753,694 B2
(45) Date of Patent: Sep. 5, 2017

(54) DIVISION AND ROOT COMPUTATION WITH FAST RESULT FORMATTING

(71) Applicant: QUALCOMM Incorporated, San Diego, CA (US)

(72) Inventors: Kenneth Alan Dockser, Cary, NC (US); Michael Thomas Dibrino, Raleigh, NC (US); Pathik Sunil Lall, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 210 days.

(21) Appl. No.: 14/692,071

(22) Filed: Apr. 21, 2015

(65) Prior Publication Data

US 2016/0313977 A1 Oct. 27, 2016

(51) Int. Cl.

| G06F 7/537 | (2006.01) |
|---|---|
| G06F 7/535 | (2006.01) |
| G06F 5/01 | (2006.01) |
| G06F 7/487 | (2006.01) |

(52) U.S. Cl.
CPC ........... *G06F 7/535* (2013.01); *G06F 5/01* (2013.01); *G06F 7/4873* (2013.01); *G06F 7/5375* (2013.01); *G06F 2205/003* (2013.01); *G06F 2207/535* (2013.01)

(58) Field of Classification Search
None
See application file for complete search history.

(56) References Cited

U.S. PATENT DOCUMENTS

| 5,010,508 A | 4/1991 | Sit et al. |
|---|---|---|
| 7,539,720 B2 | 5/2009 | Olson et al. |
| 7,672,990 B2 | 3/2010 | Dupaquis et al. |
| 8,060,551 B2 | 11/2011 | Avss et al. |
| 8,452,831 B2 | 5/2013 | Olson et al. |
| 2006/0129625 A1* | 6/2006 | Olson ............... G06F 7/4873 708/650 |
| 2010/0250639 A1* | 9/2010 | Olson ............... G06F 7/4873 708/504 |
| 2014/0059096 A1 | 2/2014 | Kitamura |
| 2016/0313977 A1* | 10/2016 | Dockser ............... G06F 5/01 |

OTHER PUBLICATIONS

International Search Report and Written Opinion—PCT/US2016/023394—ISA/EPO—Jun. 29, 2016.

* cited by examiner

*Primary Examiner* — David H Malzahn
(74) *Attorney, Agent, or Firm* — Muncy, Geissler, Olds & Lowe

(57) ABSTRACT

Systems and methods relate to division of a dividend by a divisor, with fast result formatting. Counts of leading sign bits of the dividend and the divisor are determined. The dividend and the divisor are normalized based on their respective counts of leading sign bits to obtain a normalized dividend and a normalized divisor, respectively. An exact number of significant quotient bits of a quotient of the division, based on the normalized dividend, the normalized divisor, and the counts of leading sign bits of the dividend and the divisor and used to determine a correct position of a leading bit of the quotient based on this exact number. The quotient is developed by placing the leading bit at or near the correct position and appending less significant bits to the right of the leading bit. Thus, left-shifts in each iteration and large final shifts are avoided in formatting the result.

14 Claims, 6 Drawing Sheets

DIVISION AND ROOT COMPUTATION WITH FAST RESULT FORMATTING

FIELD OF DISCLOSURE

Disclosed aspects relate to implementation of division and root computation in a processor. More specifically, exemplary aspects relate to expedited formatting of the result of division and root computation, for example, by building the result from left to right in groups of one or more bits.

BACKGROUND

Computer systems or processors may include an arithmetic and logic unit (ALU) which is used for performing arithmetic and logical operations on data. In general, the ALU may be configured to execute operations such as addition/subtraction, multiplication on integer data, as well as various other logical operations, data movement operations, etc. Some processors may include a specialized floating point unit for handling floating point operations on floating point numbers. Depending on particular implementations, the floating point unit may reside within the ALU or as a separate unit.

Operations such as division and root computations (e.g., square root) are challenging to implement because they may involve several iterations, which may involve long latencies. Particularly, in the case of integers, division and root computation involves expensive shifting operations in each iteration. To explain, integers are conventionally represented with a varying number of leading sign bits, which makes it difficult to know where a leading bit of the quotient or result of the division or root computation will be. For example, an integer represented by 32-bits, may not have its leading bit appear in the most significant bit (MSB) or leftmost bit position of the 32-bits. Rather, the integer value itself may only require a few bits (less than 32-bits) which occupy the rightmost or least significant positions and the remaining bits of the 32-bits are be padded with sign bits. The sign bits may be "0" or "1," based on whether the integer is positive or negative. Since in the case of a division, for example, inputs such as an integer dividend and an integer divisor, may have different and varying numbers of leading sign bits, it is not possible to easily determine the position of the quotient's leading bit. Since the position of the quotient's leading bit is not known, conventional integer dividers are not capable of building the quotient of the division from left to right. Therefore the quotient or result is built with the most significant bit (MSB) starting in the rightmost position and by shifting in less significant bits as they are formed in each iteration. This involves an expensive left-shift on each iteration.

On the other hand, such a left-shift on each iteration is not required for floating point division and root computation of normalized floating point numbers. Generally speaking, a normalized binary floating point number has the form, $(1.\text{mmm} \ldots) \times 2^e$, where the number "1.mmm . . . " is referred to as a significand and the number "e" is an exponent. The floating point number is said to be normalized when the leading bit or most significant bit (MSB) of the significand is "1" and the binary point follows this most significant bit. In this representation, the MSB "1" can be implied and the bits "mmm . . . " appearing after the binary point can be explicitly stored, and are referred to as a "mantissa." In addition, the floating point number can have a sign (positive/negative), which is represented by a sign bit. In the IEEE 754 binary floating point representation, for example, a normalized single precision floating point number will be represented with 32-bits, where the sign bit is 1-bit wide, the mantissa is 23-bits wide, which provides a 24-bit significand when the implied leading "1" is added, and the exponent is 8-bits wide.

A floating point divider, for example, which has normalized inputs (e.g., a normalized floating point dividend and a normalized floating point divisor) can perform the division in an iterative manner (e.g., using algorithms such as the well-known Sweeney, Robertson, and Tocher (SRT) algorithm) to generate the quotient from left to right without requiring a left-shift in each iteration. This is because the location of the quotient's binary point or its leading "1" is known based on the exponent of the quotient (the quotient of the exponent is available by simply subtracting the exponent of the divisor from the exponent of the dividend, since the divisor and dividend are both in a normalized format.) However, since the quotient may not be in a normalized format, a normalizing shift may still be required to bring the quotient into a normalized format after the final iteration.

Accordingly, there is a need for avoiding the expensive shift operations and related drawbacks seen in conventional implementations of division and root computation in processors.

SUMMARY

Exemplary aspects include systems and methods related to division of a dividend by a divisor, with fast result formatting. Counts of leading sign bits of the dividend and the divisor are determined. The dividend and the divisor are normalized based on their respective counts of leading sign bits to obtain a normalized dividend and a normalized divisor, respectively. An exact number of significant quotient bits of a quotient of the division, based on the normalized dividend, the normalized divisor, and the counts of leading sign bits of the dividend and the divisor and used to determine a correct position of a leading bit of the quotient based on this exact number. The quotient is developed by placing the leading bit at or near the correct position and appending less significant bits to the right of the leading bit. Thus, left-shifts in each iteration and large final shifts are avoided in formatting the result. The dividend and divisor may be integers. In some aspects, the quotient may be a normalized floating point number or a subnormal floating point number. Moreover, similar aspects apply to root computation as well.

For example, an exemplary aspect is directed to a method of performing a division of a dividend by a divisor, the method comprising determining counts of leading sign bits of the dividend and the divisor and normalizing the dividend and the divisor based on their respective counts of leading sign bits to obtain a normalized dividend and a normalized divisor, respectively. The method further includes determining an exact number of significant quotient bits of a quotient of the division, based on the normalized dividend, the normalized divisor, and the counts of leading sign bits of the dividend and the divisor, determining a correct position of a leading bit of the quotient based on the exact number of significant quotient bits, and developing the quotient by placing the leading bit at or near the correct position and appending less significant bits to the right of the leading bit.

Another exemplary aspect relates to an apparatus configured to perform division of a dividend with a divisor. The apparatus comprises leading sign counters to count leading sign bits of the dividend and the divisor, normalizers to normalize the dividend and the divisor based on their respective counts of leading sign bits and generate a normalized dividend and a normalized divisor, respectively, and logic to determine an exact number of significant quotient bits of a quotient of the division, based on the normalized dividend, the normalized divisor, and the counts of leading sign bits of the dividend and the divisor. The apparatus further includes logic to determine a correct position of a leading bit of the quotient based on the exact number of significant quotient bits, and logic to develop the quotient with the leading bit placed at or near the correct position and less significant bits appended to the right of the leading bit.

Another exemplary aspect relates to an apparatus for performing a division of a dividend by a divisor, the apparatus comprising means for determining counts of leading sign bits of the dividend and the divisor, and means for normalizing the dividend and the divisor based on their respective counts of leading sign bits to obtain a normalized dividend and a normalized divisor, respectively. The apparatus further includes means for determining an exact number of significant quotient bits of a quotient of the division, based on the normalized dividend, the normalized divisor, and the counts of leading sign bits of the dividend and the divisor, means for determining a correct position of a leading bit of the quotient based on the exact number of significant quotient bits, and means for developing the quotient by placing the leading bit at or near the correct position and appending less significant bits to the right of the leading bit.

Yet another exemplary aspect relates to a non-transitory computer readable storage medium comprising code, which when executed by a processor, causes the processor to perform operations for dividing a dividend by a divisor, the non-transitory computer readable storage medium comprising: code for determining counts of leading sign bits of the dividend and the divisor, code for normalizing the dividend and the divisor based on their respective counts of leading sign bits to obtain a normalized dividend and a normalized divisor, respectively, code for determining an exact number of significant quotient bits of a quotient of the division, based on the normalized dividend, the normalized divisor, and the counts of leading sign bits of the dividend and the divisor, code for determining a correct position of a leading bit of the quotient based on the exact number of significant quotient bits, and code for developing the quotient by placing the leading bit at or near the correct position and appending less significant bits to the right of the leading bit.

BRIEF DESCRIPTION OF THE DRAWINGS

The accompanying drawings are presented to aid in the description of implementations of the technology described herein and are provided solely for illustration of the implementations and not limitation thereof.

DETAILED DESCRIPTION

Figure 1:
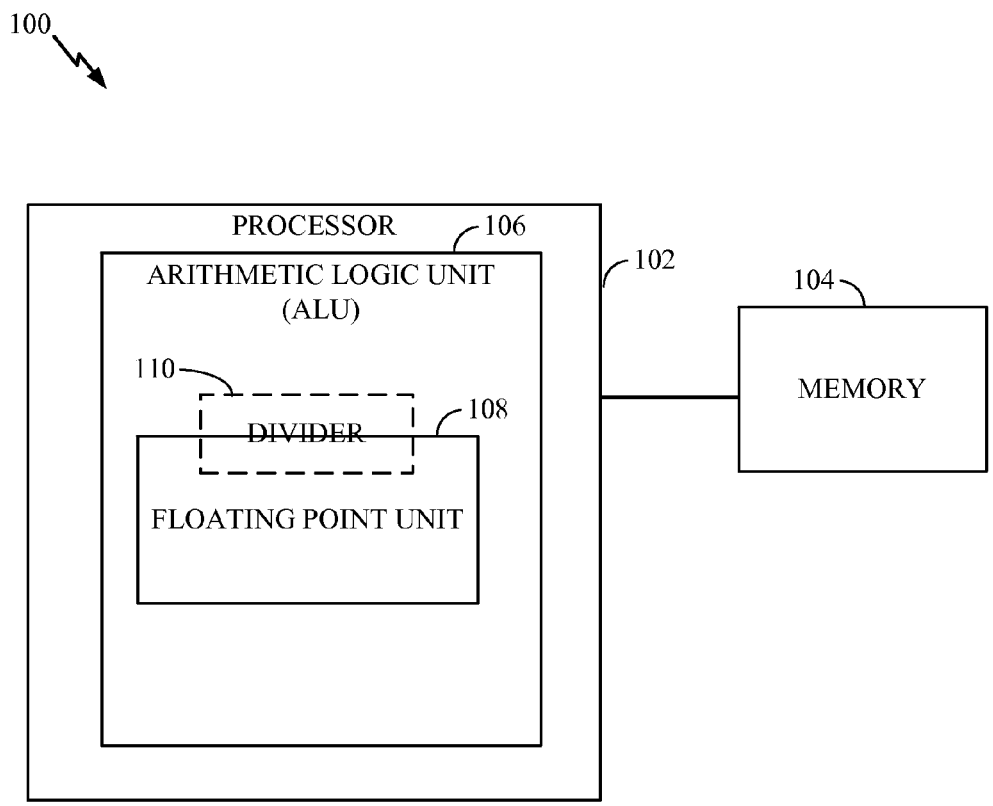
FIG. 1 is a high-level schematic of an example processing system suitable for implementing exemplary division and root computation as described herein.

Aspects of the invention are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Exemplary aspects of this disclosure relate to division/root computation with fast result formatting. In general, a position of a leading bit of the quotient or result is determined and the quotient or result is built from left to right. In some aspects, the quotient or result is built from left to right in groups, each having a same predetermined group width of one or more bits. In exemplary aspects, the group width is small in comparison to the maximum bit width of the operands. In some cases, the group width may be equal to or based on a radix of the division/root computation. A first group in which the leading bit appears is built first and the remaining groups are built to the right of this first group. In the case of integer division, the aforementioned left-shifts in each iteration is avoided by building the result from left to right, although a small final shift may be required to correctly align the final result. This alignment shift would be small with a maximum shift amount equal to the group width.

In the case of floating point numbers, the quotient or result is built by placing the leading bit in the MSB position, so that the quotient or result is a normalized floating point number at the end of the final iteration of the division/root computation, thus eliminating the final shift required to normalize the quotient or result as in conventional implementations. In some cases, the quotient or result may be a subnormal floating point number (i.e., cannot be represented in a normalized format for a given precision, as placing the leading "1" in the MSB position of the significand would require an exponent which exceeds the maximum exponent value available for that precision (e.g., 8-bits in the case of IEEE 754 single precision floating point format.)) Since a subnormal quotient or result cannot be built in a normalized format, a final shift may still be required in these cases, but since the position of the leading bit is known, this final shift would also be contained within a maximum bit width equal to the group width.

Although not a requirement, in some exemplary aspects, dividers and root computation units can be shared between integer operations and floating point operations. Integer input operands such as a dividend and a divisor may be brought into a normalized format in order to reuse hardware of a floating point unit's divider/root computation unit for building quotients from left to right. Accordingly, various design options are possible depending on particular implementations of a processor's ALU and floating point units.

Accordingly, in exemplary aspects, a divider is configured to determine, at the start of a division operation, for example, the position of a leading bit of a quotient of the division. One or more quotient bits will be generated in each iteration starting with a first iteration (the number of quotient bits generated in each iteration will be based on the radix of the division in some cases.) A first group of quotient bits which includes the leading bit will be built or generated in the first iteration and the first group will be placed in a bit position corresponding to the determined position of the leading bit. A second group will be built in a second iteration and placed to the right of the first group, and so on until a last group comprising the least significant bits of the quotient is reached. The position of the first group need not align with the leftmost or most significant bit positions of the quotient, for example. Bit positions to the left of the first group, if any, will be zero based on an initialization which takes place before the first iteration which initializes all bits of the quotient to zero. If the quotient is negative (i.e., exactly one of the divisor or the dividend is negative), then a two's complement of the final quotient is obtained.

The above process can also be extended to floating point division, to eliminate or reduce final shifts. For example, if the quotient is normal or can be presented in normalized form, then the first group will align with the leftmost bit positions of the significand and thus, a normalizing shift would not be required. If the quotient is subnormal, then the first group will be placed in a bit position corresponding to the leading bit as in the case of integer division.

Since the result of a division or root computation can be formatted quickly, without requiring expensive full shifts of a final result or multiple left-shifts during each iteration, the exemplary aspects are directed to fast result formatting for division and root computation operations in processors.

For purposes of illustration, a division algorithm that can be implemented in an exemplary divider is explained with reference to a long-hand division technique for dividing a dividend by a divisor (also known as a subtraction-based division or subtraction-division.) For ease of explanation, the dividend and divisor are assumed to be positive integers. In order to determine the quotient and any remainders, the divider starts forming a set of bits starting from the leading bit of the dividend and appending bits to the right of the leading bit to the set, until the set of bits represent a number that is greater than or equal to the divisor. Until the set of bits in the dividend reaches a number that is greater than or equal to the divisor, "0"s are placed in the quotient, which is built from left to right.

When the set of bits in the dividend reaches a number that is greater than or equal to the divisor, a "1" is placed in the quotient and the divisor is subtracted from the dividend to form a partial remainder. From this point forward the division proceeds in an iterative manner. In each iteration, additional bits from the dividend are appended to the partial remainder until the partial remainder is greater than or equal to the divisor. A "0" is appended to the right of the quotient each time when a bit from the dividend is appended to the partial remainder but the partial remainder continues to be less than the divisor. When the partial remainder becomes greater than or equal to the divisor, a "1" is appended to the right of the quotient. As before, when the partial remainder is greater than or equal to the divisor, the divisor is subtracted from the partial remainder to produce a new partial remainder. The process continues until all bits of the dividend have been appended to the partial remainder and no more bits of the dividend are left.

Conventionally, the above process may be implemented by storing the dividend in a dividend register (which can be a shift register), and shifting the dividend left by one bit position at a time, inserting the bit shifted out of the MSB of the dividend into the least significant bit (LSB) of a partial remainder register and comparing the partial remainder register to the full divisor. When the value of the partial remainder register is smaller than the divisor, a "0" is written to the LSB of the dividend register. When the value in the partial remainder register is greater than or equal to the divisor, a "1" is written to the LSB of the divided register, the divisor is subtracted from the value in the partial remainder register, and the difference is written back to the partial remainder register. The partial remainder register is shifted to the left by one bit position, the dividend register is shifted to the left by one bit position, the next dividend bit is shifted into the LSB of the partial remainder register, a compare is performed, and the process continues while there are dividend bits to be shifted into the partial remainder register. At this point, the quotient resides in the original dividend register.

With reference now to FIG. 1 is a schematic representation of processing system 100 is illustrated. The illustrated processing system 100 includes processor 102 coupled to memory 104 (keeping in mind that various other components which may be part of processing system 100 have been omitted for the sake of clarity.) Processor 102 is shown to include arithmetic logic unit (ALU) 106 and floating point unit 108. As previously noted, floating point unit 108 may be implemented as part of ALU 106 or as a separate block. In general it is assumed that operations on floating point numbers are handled by floating point unit 108 while the remaining components of ALU 106 (not explicitly illustrated) handle operations on other kinds of data including integers. Divider 110 is shown in dashed lines to denote the concept that hardware related to divider 110 may be shared between floating point unit 108 and other aspects of ALU 106 which may be used for integer operations. Similarly, aspects of a root computation unit (not shown) may also be shared for floating point and integer operations. Moreover, it will be understood that divider 110 and a root computation unit may have common aspects such as shared hardware, logic, etc. In one or more aspects, there may be separate a separate integer divider and a floating point divider, which may share some logic used in exemplary aspects for the iterative functions related to division/root computation. As such, the detailed description of divider 110 provided below applies to the various possibilities discussed above, without being limited to any specific implementation.

Figure 2:
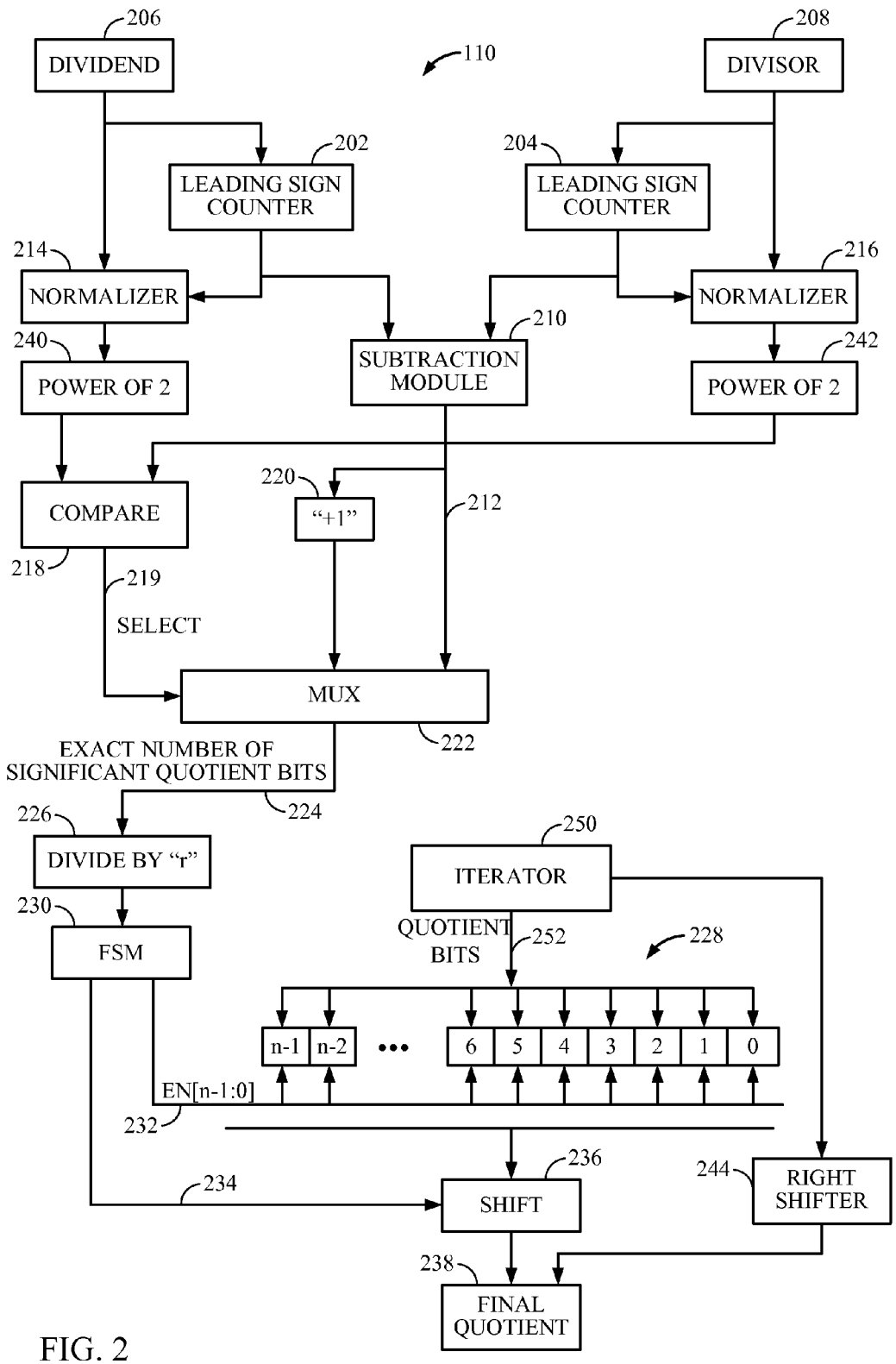
FIG. 2 is a block diagram of a divider configured to implement an exemplary division according to aspects described herein.

Accordingly with reference to FIG. 2, an expanded view of divider 110 is shown, for dividing dividend 206 by divisor 208. In one aspect, dividend 206 and divisor 208 are registers which store integer values.

As shown, divider 110 includes leading sign counters 202 and 204, which are configured to count the leading sign bits in dividend 206 and divisor 208, respectively. Knowing the leading sign bits of dividend 206 and divisor 208 makes it possible to determine the position of the leading bit of the quotient, which in turn makes it possible to build the quotient from left to right starting at or near the position of the leading bit. It is understood that the quotient may also be a signed number and therefore bits to the left of the leading sign bit may be sign bits of the quotient. An exact number of quotient bits, as referred to in this disclosure, pertains to the number of quotient bits including and to the right of the leading bit, thus excluding the sign bits, if any.

In some aspects, leading sign counters 202 and/or 204 may be implemented as leading zero counters which are fed by XOR circuits (not shown.) The XOR circuit is used to conditionally invert all bits of an operand for which a leading sign count is to be calculated, when the operand is negative (thus, the sign bits of "1" would appear as "0"s when inverted.) The inverted operand is also referred to as the one's complement of the operand. However, the true negative value of the operand is a two's complement of the operand, which is the one's complement+1. To get an accurate number of the leading sign bits, the leading "0"s of the two's complement must be counted, but obtaining the two's complement involves an expensive addition of the "+1." However, it is seen that the number of leading zeros of one's complement and two's complement of the operand are the same, except when the operand is a power of two. When the operand is a power of two, the two's complement has one more leading zero than the one's complement would. Thus, the count of leading sign bits of a number is generally determined based on a count of leading zeros if the number is positive, and a count of leading zeros of a one's complement of the number if the number is negative and not a power-of-2. If the negative number is a power-of-2, the count of leading sign bits of the number is determined by determining the count of leading zeros of the number and increasing the count of leading zeros by one.

In order to account for the cases when one or both of dividend 206 or divisor 208 are a power of two, power-of-two detectors 240 and 242 are used. If the leading sign count of dividend 206 is larger than the leading sign count of divisor 208, this means that the magnitude of dividend 206 is smaller than the magnitude of divisor 208 (since dividend 206 is padded with more sign bits.) In this case, the division would yield a fraction and there would be no quotient bits to the left of the binary point, or in the case of integer division, the final quotient 238 would be zero. If the leading sign count of the dividend is equal to the leading sign count of the divisor and compare module 218 determines that the absolute value of the normalized dividend 206 is smaller than the absolute value of the normalized divisor 208 then the final quotient 238 would once again be zero. Alternatively, a comparison can be performed on the magnitudes of dividend 206 and divisor 208 before they are normalized. If dividend 206 is smaller than divisor 208, the final quotient 238 is zero. Regardless of how it is detected, divider 110 can produce a zero final quotient 238 without any iteration. A process of initializing quotient bits to zero and using the initialized values to deliver a zero final quotient 238 without any iterations is described in the following sections.

Normalizers 214 and 216 are used to normalize dividend 206 and divisor 208, respectively. As discussed herein, normalizing the integer values of dividend 206 and divisor 208 involves shifting out the sign bits from dividend 206 and divisor 208 and retaining only their absolute values or magnitudes. The number of sign bits to be shifted is obtained from corresponding leading sign counters 202 and 204. The number of sign bits (and more particularly, a difference of the number of sign bits of dividend 206 and divisor 208) is also used in determining the position of the leading bit in the quotient. Thus, normalizers 214 and 216 are used to provide the absolute values of dividend 206 and divisor 208, respectively, by shifting them left by their corresponding leading sign counts.

The previously mentioned power-of-two detectors 240 and 242 determine whether one or both of dividend 206 or divisor 208 is a power-of-two, respectively, so that their leading sign counts can be appropriately adjusted. For simplicity, determining when dividend 206 or divisor 208 is a power of two is performed after normalization by normalizer 214 and normalizer 216. This is because power-of-two detectors 240 and 242 operate by performing a logical OR of all of the bits except for sign bits. If the result of the OR is zero, the number is a power of two. If dividend 206 is negative and is determined to be a power of two, the MSB of the normalized dividend is forced to a one to compensate for the MSB having been shifted off as a result of the leading zero count being too high by one.

Furthermore, if divisor 208 is a power of two, this means that the division can be simply accomplished by right-shifting dividend 206 by a number of bits equal to the power or exponent of 2 which equals divisor 208. This right-shift may be accomplished by right shifter 244, and further iterations in iterator 250 (which will be explained in the following sections) can be avoided. This technique can be used when the quotient is positive or negative. To account for the proper sign and take advantage of the simple process of division when divisor 208 is a power of two, dividend 206 is conditionally two's complemented and right shifted in a full shifter (not shown) by a shift amount equal to $\log_2$ (absolute value of divisor 208) to produce the final quotient 238. This two's complementing is performed only if divisor 208 is negative. Divider 110 can produce final quotient 238 in this manner when divisor 208 (i.e., the denominator of the division) is a power of two without any iterations.

Subtraction module 210 is utilized to subtract the number of leading sign bits of dividend 206 from the number of leading sign bits of divisor 208, generating difference 212. In aspects where the leading sign counter uses a leading zero counter without built-in correction, the subtraction module effectively adjusts the leading sign count of dividend 206 when dividend 206 is negative and a power of two. Since in such a case this leading sign count is too high by one, the normal carry-in of "1" to an adder used to implement subtraction module 210 is gated off, reducing the difference by one.

Compare module 218 compares and more specifically determines whether the normalized dividend 206 (output of normalizer 214, passed through power-of-two module 240) is greater than or equal to the normalized divisor 208 (output of normalizer 216, passed through power-of-two module 242.) If the normalized dividend 206 is equal to the normalized divisor 208, then the quotient is a power of two with the magnitude of the quotient determined by difference 212 of the leading sign counts. If the sign of dividend 206 is different from the sign of divisor 208, then the quotient is negative. A two's complement is then performed on power of two quotient. Divider 110 can produce a power-of-two quotient 238 without any iteration in this manner.

If the magnitude of the normalized dividend 206 is greater than the magnitude of the normalized divisor 208, then the "+1" module 220 adds a "1" to difference 212 to provide an exact number of significant quotient bits 224 which will be obtained when the normalized dividend 206 is divided by the normalized divisor 208. On the other hand, if the magnitude of the normalized dividend 206 is not greater than or equal to the magnitude of the normalized divisor 208, then exact number of significant quotient bits 224 is difference 212 output from subtraction module 210. Accordingly, at least subtraction module 210, compare module 218, and "+1" module 220 provide the logic to determine an exact number of significant quotient bits of the quotient.

Knowing the exact number of significant quotient bits 224 provides an indication of the correct position of the leading bit of the quotient. This can be understood by considering the fact that shifting a binary number one bit to the left has the effect of multiplying the number by 2, or in other words, of increasing the exponent of the number by 1. This means that when dividend 206 is normalized (e.g., in normalizer 214) based on shifting it left by an amount equal to its leading sign bits (e.g., as obtained from leading sign counter 202), the exponent of the normalized dividend 206 is proportionally increased by the amount of the left shift equal to its number of leading sign bits. Similarly, the exponent of the normalized divisor 208 will be proportional or equal to its number of leading sign bits. The exponent of the quotient will therefore be a difference of the exponents of the normalized dividend 206 and the normalized divisor 208. This difference of the exponents is either difference 212 or difference 212+1 (from module 220) as the case may be. Since the final quotient 238 will not be normalized, the exponent of the final quotient 238 provides an indication of the position of the leading bit of the final quotient 238 that will be obtained by absorbing the entire quotient within a register which holds the final quotient 238, for example. In other words, the exact number of significant bits 224 is obtained from multiplexer 222 as follows.

As will be recalled, the leading bit or leading significant bit of the final quotient 238 refers to the most significant bit of the final quotient 238 which is not a sign bit. Select 219, which is an output of compare module 218 is used as a control line to multiplexer 222 to select 212+1 (the output of the "+1" module 220) or difference 212 as the exact number of significant quotient bits 224, based on whether the normalized dividend 206 is greater than or equal to the magnitude of the normalized divisor 208, or not. This provides an indication of where the leading bit will be (it will be the most significant bit or leftmost bit of the exact number of quotient bits 224, or in other words, the leading bit will appear in a bit position which is the exact number of quotient bits 224, starting with the rightmost or the least significant bit.) Any bits to the left of the leading bit of the quotient will be sign bits.

It will be understood that in the case when compare module 218, through select 219, selects difference 212 as exact number of significant quotient bits 224 (i.e., when of the normalized dividend 206 is not greater than the magnitude of the normalized divisor 208) the normalized dividend 206 is effectively shifted to the left by 1, which would make the shifted normalized dividend larger than the normalized divisor 208.

In the illustrated implementation, the exact number of significant quotient bits 224 is divided by "r" using divide-by-r module 226, where "r" is the group width which may be obtained by $\log_2(\text{radix})$ for divider 110. Divide-by-r module 226 divides the exact number of significant quotient bits 224 by r and performs a ceiling function to round up the result to a whole number. This provides the number of quotient groups which are required to hold the exact number of significant quotient bits 224, and correspondingly, which quotient group would include the leading bit of the quotient. In other words, knowing the exact number of significant quotient bits 224 provides a quotient group number that corresponds to a position of the leading bit. Thus, at least divide-by-r module 226 provides logic to determine a correct position of a leading bit of the quotient based on the exact number of significant quotient bits. The following aspects include logic (e.g., finite state machine (FSM 230), quotient registers 228, iterator 250, and shift module 236) to develop the quotient with the leading bit placed at or near the correct position and less significant bits appended to the right of the leading bit.

In more detail, for a particular implementation of divider 110 or for a particular division, a predetermined number of "n" quotient registers 228 (labeled n−1:0) are provided in an ordered array to hold corresponding n quotient groups, each of r-bits. The number n may be obtained based on the radix of divider 110.

In some implementations, a divider and a root computation unit may have different radices. In such a case, the group width for one operation may be different from and a multiple of the group width of another operation. For example, if the division is performed in radix-16 and the square root is performed in radix-4, then the division would require radix-16 group widths (i.e., 4-bits) whereas the square root operation would require radix-4 group widths (i.e. 2-bits.) This can be handled by storing two radix-4 groups for the square root operation within the same radix-16 quotient register, for example.

Figure 3:
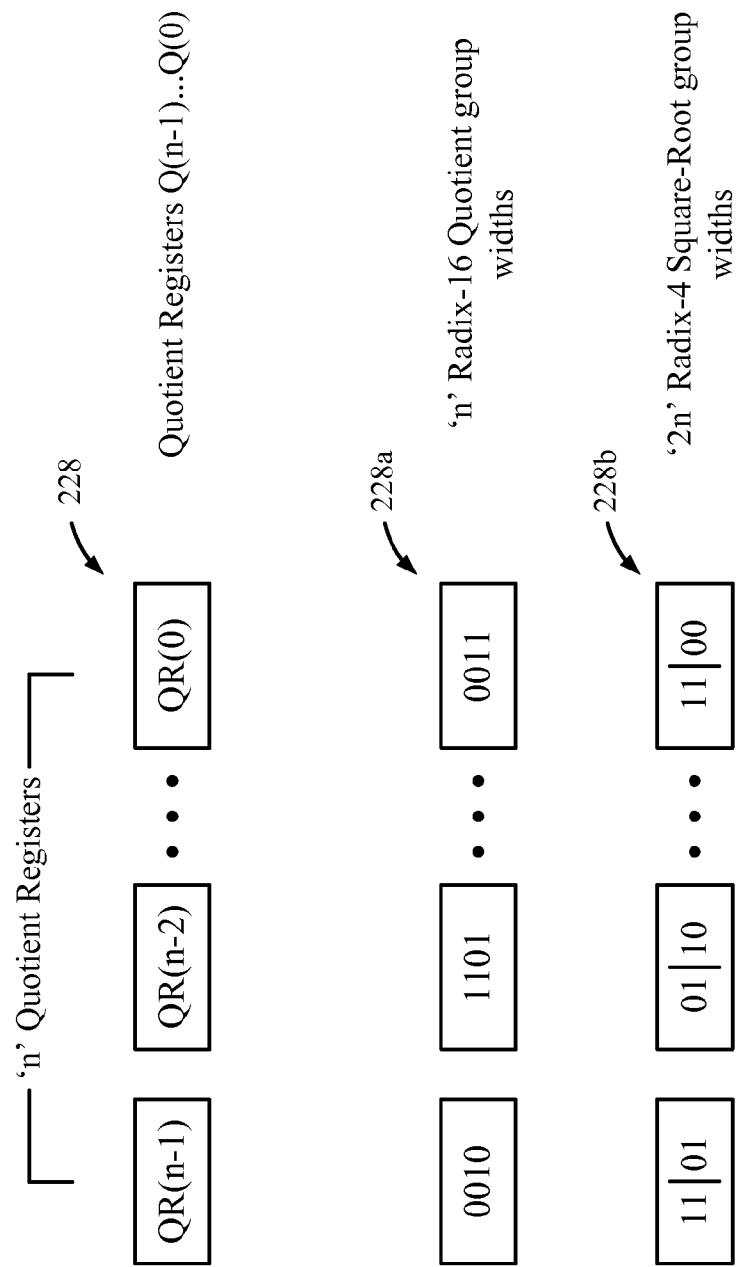
FIG. 3 is a diagram illustrating quotient registers according to one or more aspects described herein.

With reference to FIG. 3, an example of n quotient registers 228 which support different radices (e.g., a radix-16 for division and a radix-4 for square root computation) are illustrated. As shown, the n quotient registers 228 are labeled as quotient registers Q(n−1) to Q(0). In the case of radix-16 (identified by the reference numeral 228a), each of the n quotient registers include 4-bits of radix-16 quotients. In the case of radix-4 (identified by the reference numeral 228b) each of the n quotient registers would include twice the amount two 2-bit groups of radix-4 square root results. In order to support both radix-4 and radix-16, it is possible to have 2n quotient registers, each 2-bits wide. Thus quotient registers 228b would comprise 2n 2-bit wide quotient registers, each of which supports a 2-bit wide radix-4 square root result, and two of the 2-bit wide quotient registers may be used to support one 4-bit wide radix-16 quotient register.

Returning to FIG. 2, the normalized dividend 206 and the normalized divisor 208 are provided to iterator 250 (although the connections showing these inputs to iterator 250 are omitted from FIG. 2 for the sake of clarity.) In general, iterator 250 may include means for iteratively developing the quotient by generating one quotient group per iteration. As such, iterator 250 may include hardware or logic which may be available in a floating point divider which can operate on normalized floating point inputs, for example. Accordingly in some aspects, iterator 250 may comprise at least part of a floating point divider. Iterator 250 may implement a suitable division algorithm (e.g., the above-described subtraction-based division/long-hand division or using algorithms such as the SRT algorithm) for dividing the normalized dividend 206 by the normalized divisor 208 to generate up to r quotient bits 252 in each iteration. The r quotient bits 252 in each iteration form an r-bit wide quotient group. Each of the r quotient bits 252 generated in each iteration are placed in one of the n r-bit wide quotient registers 228, in an order corresponding to the bit positions in which the quotients will appear in final quotient 238. In other words, the quotient is built in the correct (or approximately correct) bit order, eliminating the need for left-shifting quotient bits generated in each iteration (as in conventional cases.)

Each of the n quotient registers 228 includes an input which can be latched, based on an enable, and provided as an output. Thus, each of the n quotient registers 228 receives an enable signal. A finite state machine (FSM) 230 is configured to provide these enable signals on the n-bit bus or signal EN [n−1:0] 232, which has one enable bit for each corresponding quotient register of the n quotient registers 228.

FSM 230 is used to decide, based on the output from divide-by-r module 226, which one of the n quotient registers 228 to enable in each iteration. If an enable for a particular quotient register is set, for example, that quotient register is configured to store or be loaded with r quotient bits 252 from iterator 250 in that iteration (it will be understood that if option 228b of FIG. 3 is selected to have 2n 2-bit wide quotient registers for a radix-4 square root operation, than two of those 2-bit wide quotient registers would be enabled by each of the n enable lines EN[n−1:0] for a radix-16 division.) When a quotient register 228 is not enabled since its corresponding enable signal is not set by FSM 230, then that quotient register will not be loaded. FSM 230 thus starts by providing an enable only to a first quotient register, for example, which will have the leading bit of the quotient in the first iteration. A first group of r quotient bits 252 from iterator 250 in the first iteration will then get loaded in the first quotient register. FSM 230 then enables a second quotient register located to the right of the first quotient register in the second iteration, which stores a second group of r quotient bits 252 (which are less significant than the r quotient bits of the first group), from iterator 250 in the second iteration to be stored in the second register, and so on, until the last quotient register corresponding to the least significant r quotient bits 252 is loaded in the last iteration.

An illustrative example will now be provided for the above operation. Assume for the purposes of explanation that the quotient register [6] 228 is enabled by EN [6] 232 output from FSM 230 in a particular cycle or iteration. In this cycle, r quotient bits 252 from iterator 250 will be loaded into the quotient register [6]. In the next iteration, FSM 230 will enable quotient register [5] by setting EN [5] 232, and the next r quotient bits 252 from iterator 250 in the next iteration will be loaded into quotient register [5]. This continues to the right until the quotient register [0] is loaded.

It will be noted that the exact number of significant quotient bits 224 may not be an exact multiple of the group width or quotient register bit width "r." However, when the process of loading the quotient registers 228 starts, in the first iteration, the first quotient register will be loaded such that the leading bit of the quotient will be aligned with the leftmost position of the first quotient register. In other words, r quotient bits 252 from iterator 250 in the first iteration will be loaded into an r-bit wide first quotient register, which would align the leading bit (i.e., MSB of the r quotient bits 252) in the leftmost bit position of the first quotient register. However, the last iteration may not generate r significant quotient bits since the exact number of significant quotient bits 224 may not be an exact multiple of r. This means that the least significant quotient bit from the last iteration may not align with the least significant bit of quotient register [0]. When the final quotient 238 is formed by concatenating quotient bits from the first quotient register down to quotient register [0], the least significant bit of the concatenated result may be misaligned from the LSB position of the expected final quotient 238. This misalignment, if any, will be contained within the bit width of a single r-bit wide quotient register. Thus, to remove this misalignment, a maximum shift of up to r−1 bits may be required.

This final shifting is performed by shift module 236, which brings the leading bit of final quotient 238 to the expected bit position. Shift module 236 may be controlled by another output of FSM 230 which provides an indication of how many bits (0 to r−1) of misalignment there may be. Shift module 236 only a small shifter which would need to shift within a small number of up to r−1 bits (e.g., a shift of up to 3-bits for a radix-16 division) and thus avoids the need for a full shifter. As previously described, in conventional techniques, developing the quotient of a division consists of shifting in quotient bits as they are generated and then at the end using either a large and slow full shifter (e.g., a barrel shifter) that may shift, for example, up to 64 bits in a single cycle. However, because a full shifter, may consume a significant amount of power, it is slow, and may slow down the cycle time. Alternatively, a tree of shifters may be used to achieve the same effect as a full shifter in conventional aspects, which can allows smaller shifts to be performed in multiple clock cycles to deliver the full shift amount. In either case, performing a full shift is much slower and more time consuming than the small shift of up to r−1 bits in exemplary aspects as described above.

In effect, the above process can be considered as pre-shifting a quotient by determining where the position of the leading bit in the final quotient and placing the quotient, left aligned, into groups of r-bits. This places the leading bit of the final quotient within a few bits of its correct position so that the final shift in shifting block 236 is a small amount up to r−1 bits, rather than the full width of the final quotient 236.

As previously noted, exemplary techniques for developing the quotient starting with approximately the correct position of the leading bit and avoiding multiple left-shifts (in each iteration) and large final shift, can be used for floating-point division as well. For example, if the final quotient 238 is subnormal, the shift amount required would only be up to r−1 bits, rather than up to the full bit-width (e.g., 32 or 64-bits) of the final quotient 238. Even if the final quotient is normal, conventional floating point dividers require a final shifting to normalize the quotient based on the precision, which is not required in exemplary aspects which reduce or eliminate this final shift. Moreover, in exemplary aspects, an exact number of quotient bits is generated, thus avoiding unnecessary iterations.

In some aspects, a constant offset may be added to the final shift to compensate for a mismatch between the alignment of the quotient registers 228 and a destination register in which final quotient 238 may need to be stored. This can happen since the data format width might not be a multiple of the number of bits produced each cycle. For example, a radix-8 divider produces 3 bits per cycle, for a total of 66 bits for a 64-bit divide. The final shift in shift module 236 uses an offset of 2 in this case. In other words, rather than a final shift of 0 to r−1, an offset of 2 may be added: 2+0 to 2+r−1. Alternatively, a result multiplexor (not shown) may perform this alignment.

In some aspects, an initialization process, all of the quotient registers 228 are initialized to 0 at the beginning of a division operation. If the magnitude of divided 206 (prior to any conditional shifts) is smaller than that of divisor 208, the final quotient is of a value "0" as noted previously, and therefore, the initialized Os from the quotient registers 228 are provided as final quotient 228, without any further iterations. If at any time in the iterations the partial remainder is 0, the iterations stop as the LSBs are already zero.

For floating point quotients, it will be recalled that the sign (positive/negative) is provided through a sign bit and the significand represented in the final quotient 238 is unsigned. For unsigned integers and for positive integer quotients (i.e., where dividend 206 and divisor 208 have the same sign), the sign bits of final quotient 238 are already set to "0" since all quotient registers 228 are initialized to "0," which means that quotient registers 228 to the left of the first quotient register comprising the leading bit would remain at "0" (also, noting that within the first quotient register, the leading bit is left aligned, meaning that no sign bits are present in the first group.) For integer quotients, it is possible for the final quotient 238 to be a negative number (e.g., either dividend 206 is negative or divisor 208 is negative, or in other words, dividend 206 and divisor 208 have opposite signs). If final quotient 238 is negative, a two's complement is applied to the final-shifted quotient. As previously discussed, implementing a two's complement of a number involves inverting all the bits and adding "1" to the inverted number. The two's complement of final quotient 238 may be obtained in this manner by inverting all bits of final quotient 238 and incrementing it or adding a "1" to it (hardware for this inversion increment is not shown in FIG. 2 but can be implemented using XOR logic to conditionally invert the bits if final quotient 238 is negative and an adder to add "1.")

Figure 4:
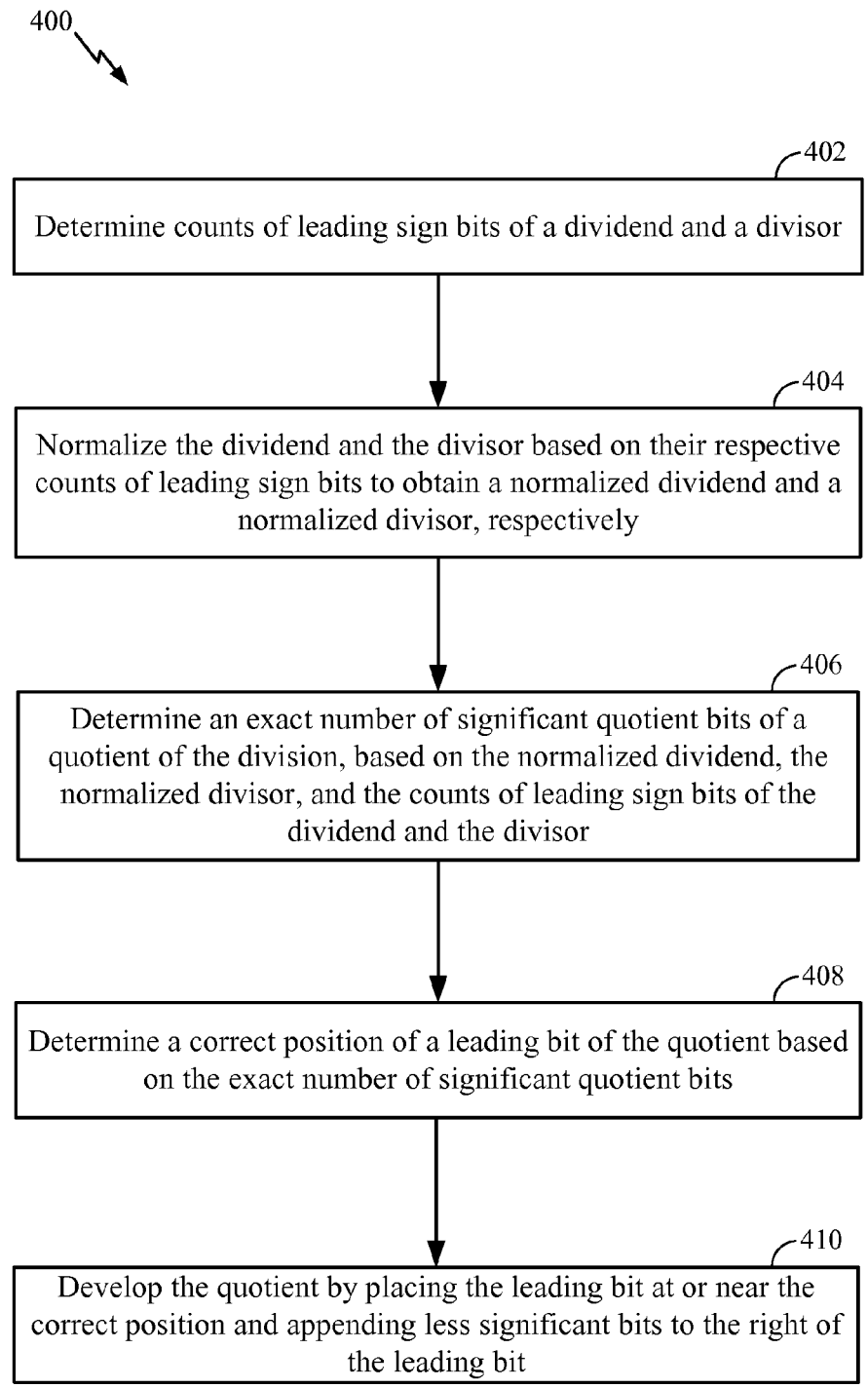
FIG. 4 is a flowchart illustrating a method of performing division with fast result formatting according to exemplary aspects described herein.

It will be appreciated that aspects include various methods for performing the processes, functions and/or algorithms disclosed herein. For example, FIG. 4 is a flow chart of a method 400 for fast result formatting of a quotient of a division of a dividend with a divisor, according to exemplary aspects. Method 400 is described with reference to FIG. 2, for example.

In Block 402, method 400 includes determining counts of leading sign bits of the dividend and the divisor. For example, the leading sign bits of dividend 206 and divisor 208 are obtained from leading sign counter 202 and leading sign counter 204, respectively.

In Block 404, method 400 proceeds to normalizing the dividend and the divisor based on their respective counts of leading sign bits to obtain a normalized dividend and a normalized divisor, respectively. For example, using normalizer 214, normalizing dividend 206 involves shifting dividend 206 left by an amount equal to its leading sign bits such that a leading bit (i.e., leading "1" when dividend 206 is positive or a leading "0" when dividend 206 is negative) appears in the most significant bit of the normalized dividend. Similarly using normalizer 216, normalizing divisor 208 involves shifting divisor 208 left by an amount equal to its leading sign bits.

In Block 406, an exact number of significant quotient bits of the quotient is determined based on the normalized dividend, the normalized divisor, and the counts of leading sign bits of the dividend and the divisor. For example, if the magnitude of the normalized dividend 206 is greater than the magnitude of the normalized divisor 208, then the "+1" module 220 adds a "1" to difference 212 to provide an exact number of significant quotient bits 224 which will be obtained when the normalized dividend 206 is divided by the normalized divisor 208. On the other hand, if the magnitude of the normalized dividend 206 is not greater than or equal to the magnitude of the normalized divisor 208, then exact number of significant quotient bits 224 is difference 212 output from subtraction module 210.

In Block 408, method 400 involves determining a correct position of a leading bit of the quotient based on the exact number of significant quotient bits. For example, the correct position of the leading sign bit of the quotient is the most significant bit or leftmost bit of the exact number of quotient bits 224. In other words, the leading bit will appear in a correct position which is at the exact number of quotient bits 224, starting with the rightmost or the least significant bit. Any bits to the left of the leading bit of the quotient will be sign bits.

Finally in Block 410, method 400 involves developing the quotient by placing the leading bit at or near the correct position and appending less significant bits to the right of the leading bit. For example, divide-by-r module 226 divides the exact number of significant quotient bits 224 is divided by "r" (which may be equal to $\log_2$ (radix of the division)), to obtain a number of quotient groups which are required to hold the exact number of significant quotient bits 224, and starting with a first quotient group which includes the leading bit, the quotient can be built with "r" quotient bits or one quotient group in each iteration. The first quotient group comprising the leading bit can be placed in a first quotient register of an array of "n" quotient registers 228, a less significant second quotient group comprising quotient bits less significant than quotient bits of the first quotient group can be placed in a second quotient register to the right of the first quotient register in the array of "n" quotient registers 228, etc. In this manner, the quotient is developed by placing the quotient at or near the correct position, because a final shift of up to r−1 bits may be needed. For example, the quotient groups from quotient registers 228 are concatenated to form a concatenated result which is shifted by shift module 236 by up to r−1 bits to form the final quotient 238.

Figure 5:
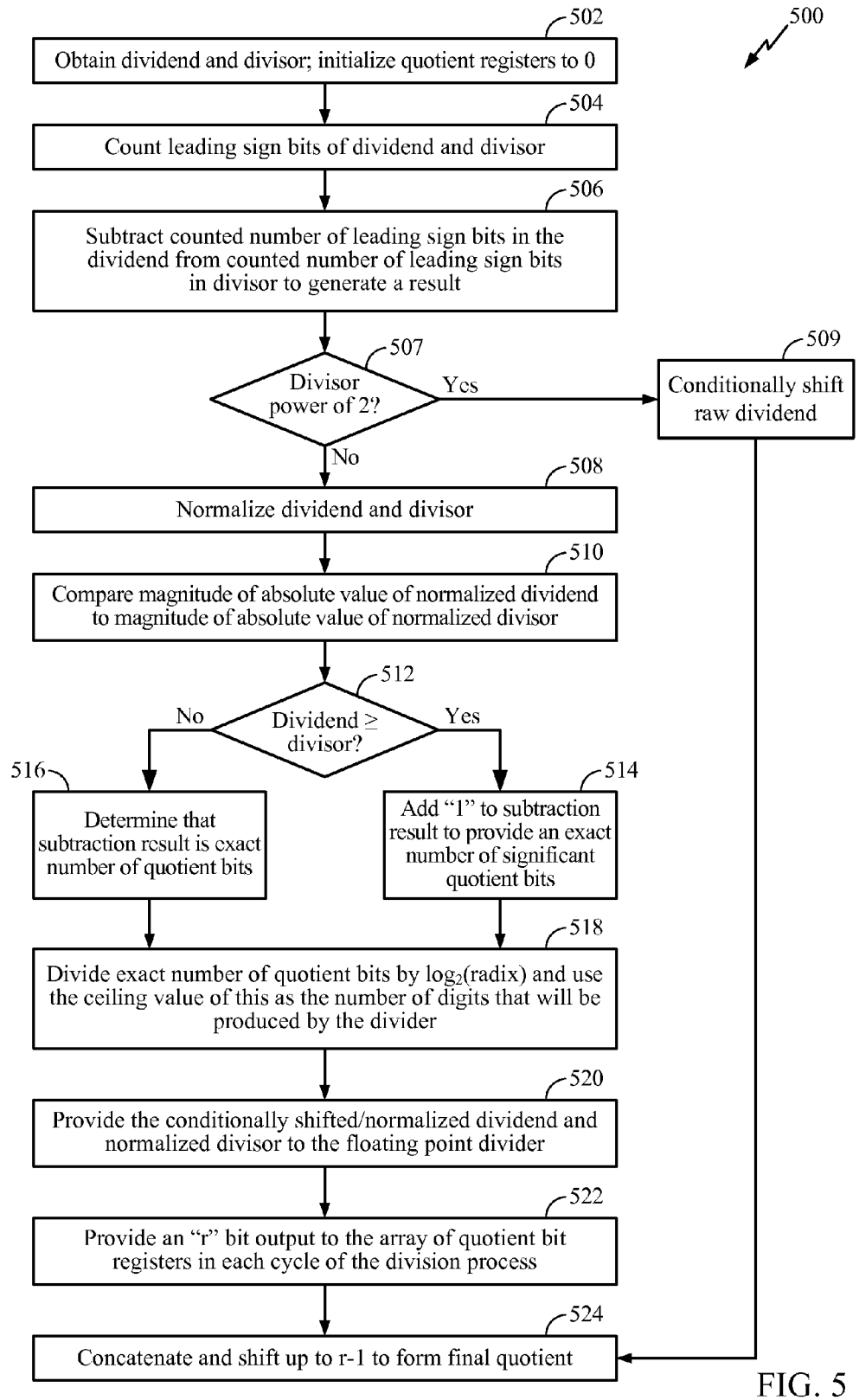
FIG. 5 is another flowchart illustrating a method of performing division with fast result formatting according to exemplary aspects described herein.

FIG. 5 is another flow chart for a method 500 of performing a division with fast result formatting according to other exemplary aspects. In some cases, method 500 may be a particular implementation according to the general framework of method 400 described previously. Method 500 is also described with reference to FIG. 2, as follows.

In Block 502, method 500 obtains a dividend, a divisor, and initializes quotient registers to 0. In one or more implementations, leading sign counter 202, leading sign counter 204, normalizer 214, and normalizer 216 are provided with dividend 206 and divisor 208 and quotient registers 228 are initialized to 0.

In Block 504, method 500 counts the leading sign bits of the dividend and the divisor. In one or more implementations, leading sign counter 202 and leading sign counter 204 count the leading sign bits of dividend 206 and divisor 208, respectively.

In Block 506, method 500 subtracts the counted number of leading sign bits in the dividend from the counted number of leading sign bits in the divisor to generate a difference. In one or more implementations, subtraction module 210 subtracts the counted number of leading sign bits of dividend 206 from the counted number of leading sign bits of divisor 208 generating difference 212.

In Block 507, method 500 determines if the divisor is a power of two. In one or more implementations, power-of-two module 242 determines if divisor 208 is a power of two.

If the divisor is a power of two, then in Block 509, method 500 conditionally shifts the raw dividend, i.e., the unmodified original value dividend 206 before it has been normalized, shifted, etc. In one or more implementations, right shifter 244 produces final quotient 238 by right shifting the raw dividend (which may be conditionally-two's-complemented to account for sign of the final quotient 238) by a shift amount equal to $\log_2$(absolute value (divisor)). The two's complement is performed when the divisor is negative. The final quotient 238 is produced by right shifting by 0 to r−1 places using shift module 236. Thus, once the shifted raw dividend is produced in the case of a power-of-2 divisor, then division is complete, no iteration is performed, and method 500 proceeds to Block 524 to produce final exact quotient 238.

If the divisor is not a power of two, then in Block 508 normalizer 214 normalizes dividend 206 by determining the absolute value of dividend 206 and shifting the absolute value of dividend 206 left by the leading sign count determined by leading sign counter 202. Normalizer 216 normalizes divisor 208 by determining the absolute value of divisor 208 and shifting the absolute value of divisor 208 left by the leading sign count determined by leading sign counter 204. If the raw dividend was a negative power of two, the MSB of the dividend is forced to a "1."

In Block 510, method 500 compares the magnitude of the absolute value of the normalized dividend to the magnitude of the absolute value of the normalized divisor. In one or more implementations compare module 218 determines whether the normalized dividend 206 is greater than or equal to the normalized divisor 208.

In Block 512, method 500 determines whether the normalized dividend 206 is greater than or equal to the normalized divisor 208. In one or more implementations, the compare module 218 determines whether the normalized dividend 206 is greater than or equal to the normalized divisor 208.

If the normalized dividend 206 is greater than or equal to the normalized divisor 208, then in Block 514 the "+1" module 220 adds a "1" to difference 212 output from subtraction module 210 to provide an exact number of significant quotient bits 224. In one or more implementations, the compare module 218 causes multiplexor 222 to select the output of the "+1" module 220 as exact number of significant quotient bits 224 when normalized dividend 206 is greater than or equal to the normalized divisor 208.

On the other hand, if the normalized dividend 206 is not greater than or equal to (i.e., is less than) the normalized divisor 208, then in Block 516 method 500 determines that difference 212 is the exact number of quotient bits and compare module 218 causes multiplexor 222 to select difference 212 output from subtract module 210. Additionally, the normalized dividend is conditionally shifted to the left by one bit position (not explicitly shown).

In Block 518, method 500 divides the exact number of quotient bits by $\log_2$(radix). In one or more implementations, divide-by-r module 226 takes the ceiling value of this division and uses it as the number of digits that will be produced by iterator 250 in each iteration.

In Block 520, method 500 provides the conditionally shifted and normalized dividend and the normalized divisor to iterator 250.

In Block 522, method 500 provides r quotient bits to quotient registers 228 in each iteration of the division.

In Block 524, the method 500 produces the final quotient, for example, final quotient 238 by concatenating the quotient bits from the quotient registers 228 having the number of significant quotient bits and shifting the concatenated result by up to r−1 positions.

As previously mentioned, the above processes and systems can be suitably adopted for computing a root (e.g., square root) of a number with fast result formatting. In general, the root would be computed by determining a correct position of a leading bit of the root based on an exact number of bits in the root and the root would be developed starting at a position at or near the correct position and building subsequent bits to the right of the leading bit. A further detailed explanation for root computation will be avoided due to substantial similarities with the above-described aspects related to division with fast result formatting.

Figure 6:
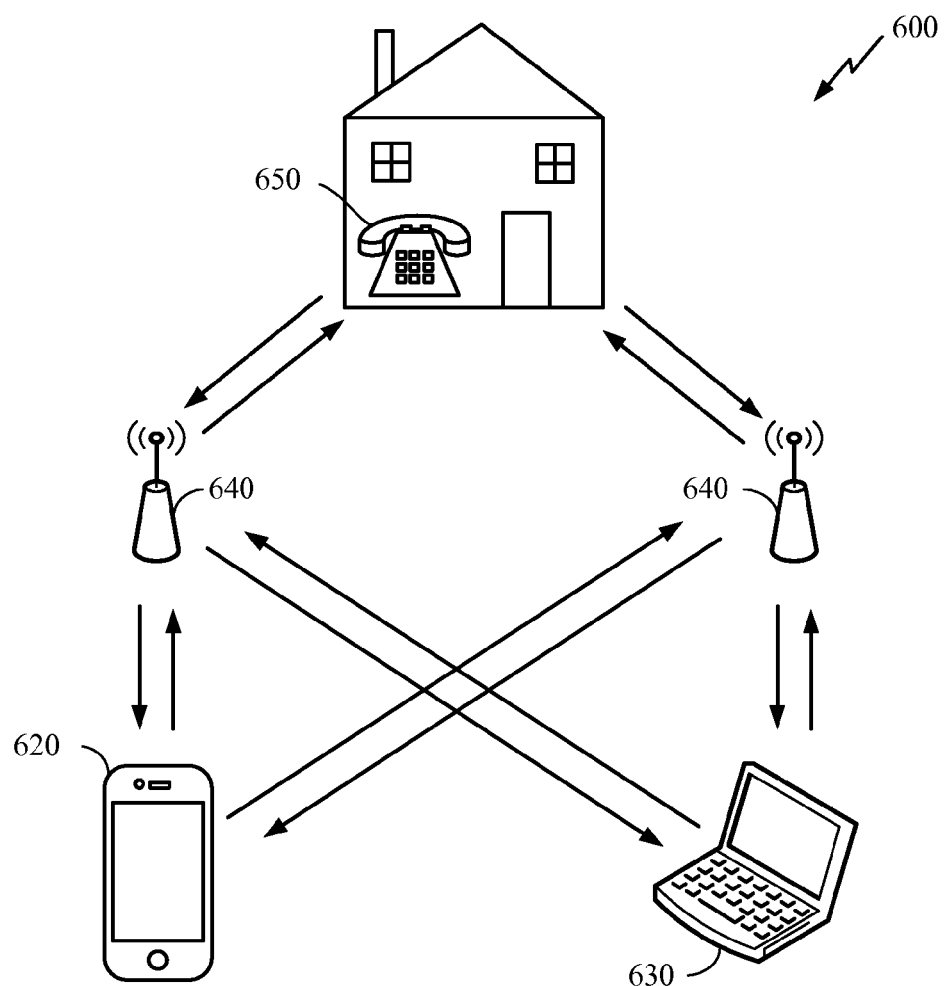
FIG. 6 is a block diagram showing an exemplary wireless communication system in which a divider or root computation unit according to exemplary aspects described herein may be employed.

FIG. 6 illustrates an exemplary wireless communication system 600 in which an exemplary divider or root computation unit with fast result formatting may be advantageously employed. For purposes of illustration, FIG. 6 shows three remote units 620, 630, and 650 and two base stations 640. In FIG. 6, remote unit 620 is shown as a mobile telephone, remote unit 630 is shown as a portable computer, and remote unit 650 is shown as a fixed location remote unit in a wireless local loop system. For example, the remote units may be mobile phones, hand-held personal communication systems (PCS) units, portable data units such as personal data assistants, GPS enabled devices, navigation devices, settop boxes, music players, video players, entertainment units, fixed location data units such as meter reading equipment, or any other device that stores or retrieves data or computer instructions, or any combination thereof. Any of remote units 620, 630, and 650 may include a divider or root computation unit as disclosed herein.

Although FIG. 6 illustrates remote units according to the teachings of the disclosure, the disclosure is not limited to these exemplary illustrated units. Aspects of the disclosure may be suitably employed in any device which includes active integrated circuitry including memory and on-chip circuitry for test and characterization.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include a computer readable media embodying a method of implementing a division or root computation with fast result formatting in the processor. Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. An apparatus configured to perform division of a dividend with a divisor, the apparatus comprising:
    leading sign counters to count leading sign bits of the dividend and the divisor;
    normalizers to normalize the dividend and the divisor based on their respective counts of leading sign bits and generate a normalized dividend and a normalized divisor, respectively;
    logic to determine an exact number of significant quotient bits of a quotient of the division, based on the normalized dividend, the normalized divisor, and the counts of leading sign bits of the dividend and the divisor;
    logic to determine a correct position of a leading bit of the quotient based on the exact number of significant quotient bits; and
    logic to develop the quotient with the leading bit placed at or near the correct position and less significant bits appended to the right of the leading bit.

2. The apparatus of claim 1, wherein the logic to determine the correct position of the leading bit of the quotient comprises a divide-by-r module to determine a number of quotient groups to hold the exact number of significant quotient bits, based on the exact number of significant quotient bits and a radix of the division, each quotient group comprising a number r of two or more bits.

3. The apparatus of claim 2, wherein the logic to develop the quotient further comprises an iterator to iteratively develop the quotient, one quotient group per iteration.

4. The apparatus of claim 3, wherein the iterator comprises at least part of a floating point divider.

5. The apparatus of claim 3, wherein the logic to develop the quotient further comprises an array of n quotient registers to receive bits of the quotient from the iterator, wherein a first quotient register of the array is configured to store a first quotient group comprising the leading bit when an enable corresponding to the first quotient register is set.

6. The apparatus of claim 5, wherein the logic to develop the quotient further comprises a finite state machine (FSM) to selectively set the enable corresponding to the first quotient register in the first iteration.

7. The apparatus of claim 5, wherein a second register of the array is configured to store a second quotient group comprising quotient bits less significant than quotient bits of the first quotient group, wherein the second quotient register is located to the right of the first quotient register in the array of n quotient registers.

8. The apparatus of claim 2, wherein the logic to determine the correct position of the leading bit of the quotient comprises a shift module to shift a concatenated result from the number of quotient groups by up to r−1 bits to form the quotient.

9. The apparatus of claim 8, wherein the quotient is a normalized floating point number or a subnormal floating point number.

10. The apparatus of claim 1, wherein the dividend and the divisor are integers.

11. The apparatus of claim 1, wherein the logic to determine an exact number of significant quotient bits comprises
    a subtraction module to determine a difference between the count of leading sign bits of the dividend and the count of the leading sign bits of the divisor plus one; and
    a compare module to compare the magnitude of the normalized dividend and the magnitude of the normalized divisor.

12. The apparatus of claim 1, wherein the leading sign counters comprise leading zero counters and XOR circuits.

13. An apparatus for performing a division of a dividend by a divisor, the apparatus comprising:
    means for determining counts of leading sign bits of the dividend and the divisor;
    means for normalizing the dividend and the divisor based on their respective counts of leading sign bits to obtain a normalized dividend and a normalized divisor, respectively;
    means for determining an exact number of significant quotient bits of a quotient of the division, based on the normalized dividend, the normalized divisor, and the counts of leading sign bits of the dividend and the divisor;
    means for determining a correct position of a leading bit of the quotient based on the exact number of significant quotient bits; and
    means for developing the quotient by placing the leading bit at or near the correct position and appending less significant bits to the right of the leading bit.

14. The apparatus of claim 13, wherein the means for determining the correct position further comprises means for determining a number of quotient groups to hold the exact number of significant quotient bits, based on the exact number of significant quotient bits and a radix of the division, each quotient group comprising a number r of two or more bits; and means for iteratively developing the quotient by generating one quotient group per iteration.

* * * * *